(12) United States Patent
Steinke et al.

(10) Patent No.: US 11,429,593 B2
(45) Date of Patent: Aug. 30, 2022

(54) MAINTAINING A SHARED STATE AMONG NETWORKED COMPUTING DEVICES USING A SHARED DATA STORE

(71) Applicant: EMC IP Holding Company LLC, Hopkinton, MA (US)

(72) Inventors: Ronald Steinke, Tacoma, WA (US); David T. Leimbach, Lynnwood, WA (US); Mark Ranger, Seattle, WA (US); Douglas Kilpatrick, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 167 days.

(21) Appl. No.: 16/740,831

(22) Filed: Jan. 13, 2020

(65) Prior Publication Data
US 2021/0216530 A1 Jul. 15, 2021

(51) Int. Cl.
G06F 7/00 (2006.01)
G06F 16/23 (2019.01)
H04L 67/1097 (2022.01)
H04L 67/06 (2022.01)

(52) U.S. Cl.
CPC ...... *G06F 16/2379* (2019.01); *G06F 16/2365* (2019.01); *H04L 67/06* (2013.01); *H04L 67/1097* (2013.01)

(58) Field of Classification Search
CPC . G06F 16/2365; G06F 16/2379; H04L 67/06; H04L 67/1097
USPC .................................................. 707/600–899
See application file for complete search history.

(56) References Cited

U.S. PATENT DOCUMENTS

| 5,813,016 A * | 9/1998 | Sumimoto .......... G06F 16/1767 |
| 2013/0318035 A1 * | 11/2013 | Swanson ............... G06F 16/182 707/608 |

* cited by examiner

*Primary Examiner* — Isaac M Woo
(74) *Attorney, Agent, or Firm* — Amin, Turocy & Watson, LLP

(57) ABSTRACT

Sharing a state between network computing devices is described. For instance, a first state update can be received from a second computing device via a network connection. Further, in a shared state file stored in a storage device coupled to the first computing device, a first portion of the shared state file is identified that is allocated to the second computing device. Further, based on the first state update, the first portion of the shared state file can be updated.

20 Claims, 10 Drawing Sheets

MAINTAINING A SHARED STATE AMONG NETWORKED COMPUTING DEVICES USING A SHARED DATA STORE

TECHNICAL FIELD

The subject application generally relates to computer applications, and, for example, to sharing a state between network computing devices, and related embodiments.

BACKGROUND

As the use of large amounts of data by organizations increases, modern storage solutions can incorporate different approaches to scaling capacity. One approach to expansion uses distributed systems to horizontally scale capacity, e.g., add additional computing devices to a system to increase capacity, rather than upgrade the capabilities of existing systems. One of the benefits to using distributed systems is an increase in performance that can be realized based on concurrent operation of the systems, e.g., lower latency. Another benefit involves fault tolerance, e.g., individual systems can fail without affecting the entire system.

One aspect that can facilitate the benefits of distributed systems is the capacity for individual computing devices of distributed systems share the same state. To maintain a shared state across computing devices of a distributed system, the computing devices can exchange information corresponding to updates in the state of different devices, e.g., by interprocess communications (IPC).

Conventional approaches to sharing state information can use hard to configure, and often out of band communication channels, and these approaches often cannot scale effectively.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a processor and a memory that can store executable instructions that, when executed by the processor, can facilitate performance of operations. The operations can comprise receiving a first state update from a second computing device via a network connection. Further, the operations can comprise identifying in a shared state file stored in a storage device coupled to the first computing device, a first portion of the shared state file allocated to the second computing device. Operations can further comprise, updating, based on the first state update, the first portion of the shared state file.

One or more additional embodiments can provide a method comprising receiving, by a first computing device comprising a processor, a first state update from a second computing device via a network connection; state update receiving component identifying, by the first computing device, in a shared state file stored in a storage device, a first portion of the shared state file allocated to the second computing device; and state update storage interface component updating, by the first computing device, based on the first state update, the first portion of the shared state file.

Additional embodiments can comprise a machine-readable storage medium comprising executable instructions that, when executed by a processor of a computing device, facilitate performance of operations, the operations comprising receiving a first state update from a second computing device via a network connection. An additional operation comprises identifying in a shared state file stored in a storage device coupled to the first computing device, a first portion of the shared state file allocated to the second computing device. Further, an operation facilitated can comprise updating, based on the first state update, the first portion of the shared state file.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating maintaining a shared state among computing devices, in accordance with one or more embodiments. As will be understood, the implementation(s) described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein can employ hardware and/or software to solve problems that are highly technical in nature (e.g., rapid determination and dissemination of distributed system state information, as well as the synchronizing of processes), that are not abstract and cannot be performed as a set of mental acts by a human. For example, a human, or even a plurality of humans, cannot efficiently, accurately and effectively, collect, encode, and transfer state information for the nodes of a distributed system, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
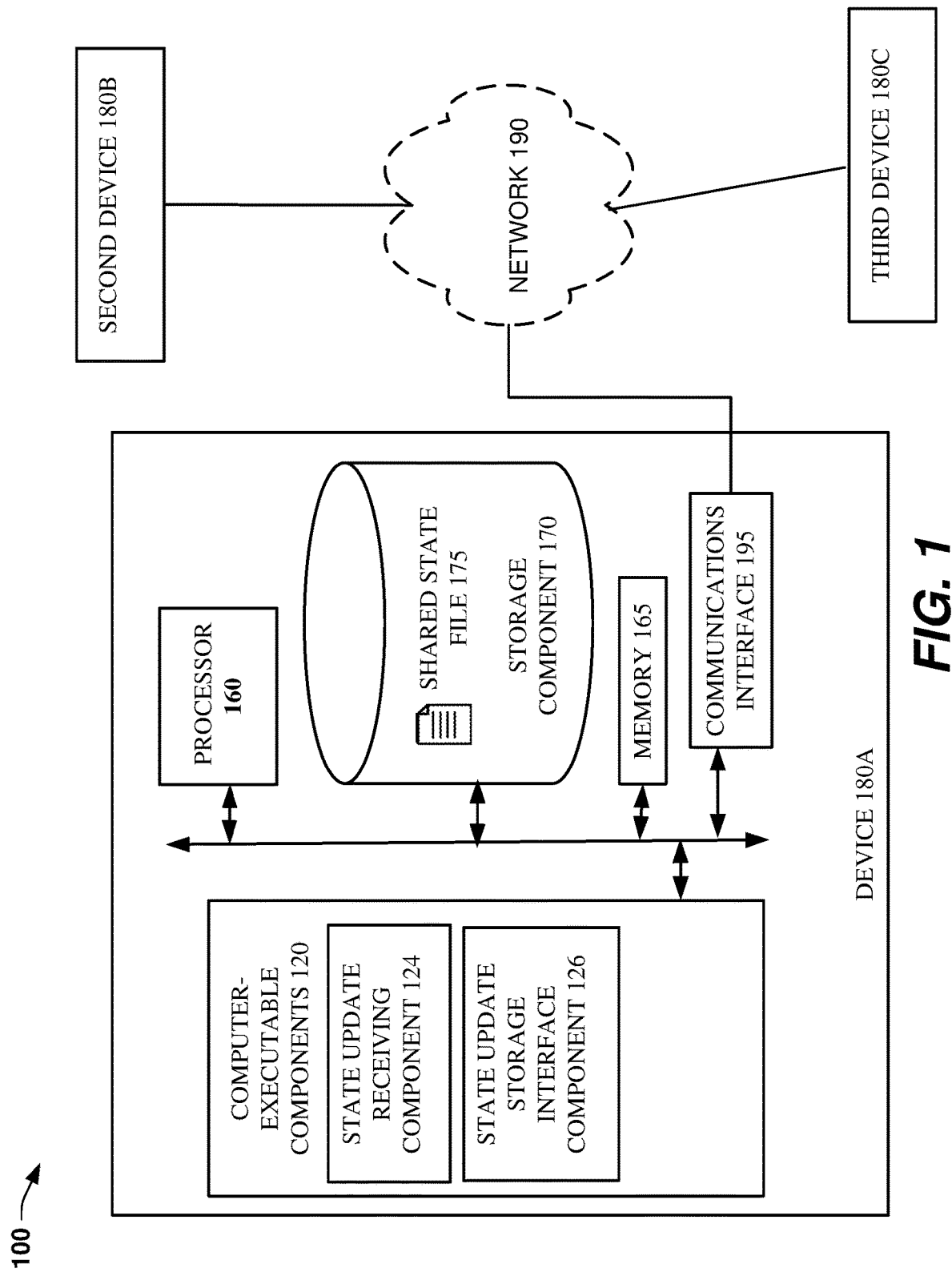
FIG. 1 illustrates a block diagram of an example, non-limiting system that can facilitate maintaining a shared state among computing devices, in accordance with various aspects and implementations of the subject disclosure.

FIG. 1 illustrates a block diagram of an example, non-limiting system 100 that can facilitate maintaining a shared state among computing devices, in accordance with various aspects and implementations of the subject disclosure. Repetitive description of like elements and/or processes employed in respective embodiments is omitted for sake of brevity.

System 100 can include first device 180A communicatively coupled to second device 180B and second device 180C via network 190. First device 180A can include computer-executable components 120, processor 160, storage component 170, memory 165, and communications interface 193. Storage component 170 can include shared file state 175. Examples of network 190 that can be used by one or more embodiments are discussed with FIGS. 9 and 10 below.

In one or more embodiments, system 100 can comprise memory 165 that can store computer executable components, and processor 160 that can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1016 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

Computer-executable components 120 can include state receiving component 124, state update storage interface component 126 and other components described or suggested by one or more embodiments discussed herein. For example, in one or more embodiments, memory 165 can store computer-executable components 120 that, when executed by processor 160, can facilitate performance of operations described further herein.

As described in some examples below, an example system that can benefit in some circumstances from the use of one or more embodiments, is a system that can facilitate sharing resources among networked computing devices, e.g., file storage systems and databases. In some implementations, system 100 can be a file storage system that implements a data protection system. In different implementations, data protection systems can benefit from the flexible expansion that one or more embodiments can facilitate, e.g., adding additional capacity with additional computing devices that can be included in the shared state described herein.

Example data protection systems which can employ one or more of the approaches described with embodiments herein include, but are not limited to EMC ISILON®, an example network attached storage (NAS) platform provided by DELL EMC, Inc. Example storage array devices which can employ one or more of the approaches described with embodiments herein include, but are not limited to, Power-Max enterprise data storage array system provided by DELL EMC, Inc.

As will be understood, the implementation(s) described herein are non-limiting examples, and variations to the technology can be implemented. For instance, even though examples described herein where NAS systems can have a shared state based on shared state file 175 stored in the NAS, the technologies described herein can be used by any connected computing devices that have different zones of storage performance, e.g., a storage device components of a other distributed systems that can share stored information, e.g., database servers and web servers. As such, any of the embodiments, aspects, concepts, structures, functionalities, implementations and/or examples described herein are non-limiting, and the technology may be used in various ways that provide benefits and advantages in distributed systems technology in general, both for existing technologies and technologies in this area that are yet to be developed.

Figure 2:
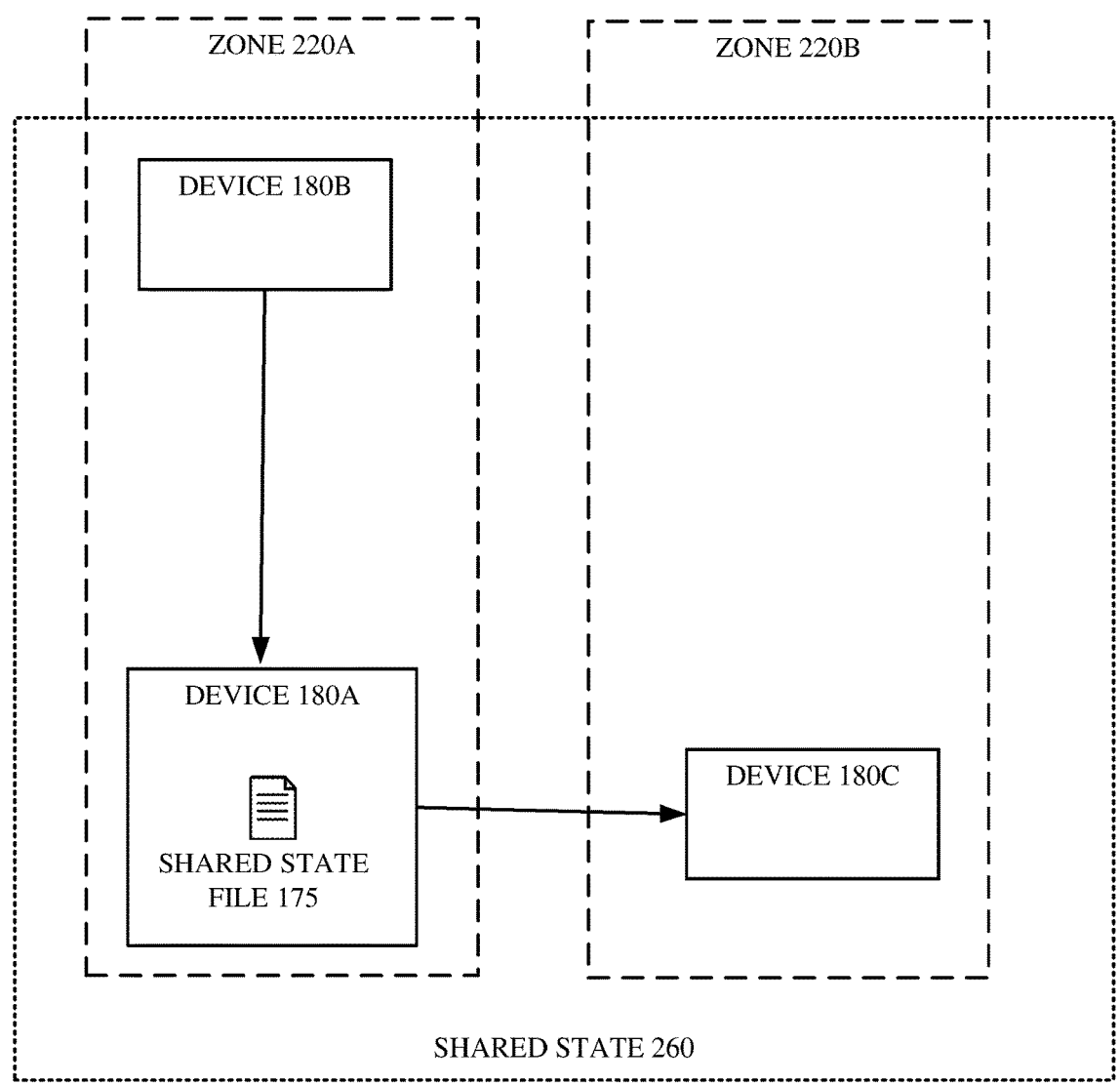
FIG. 2 illustrates a block diagram of a system that can facilitate maintaining a shared state among computing devices, in accordance with one or more embodiments.
Figure 3:
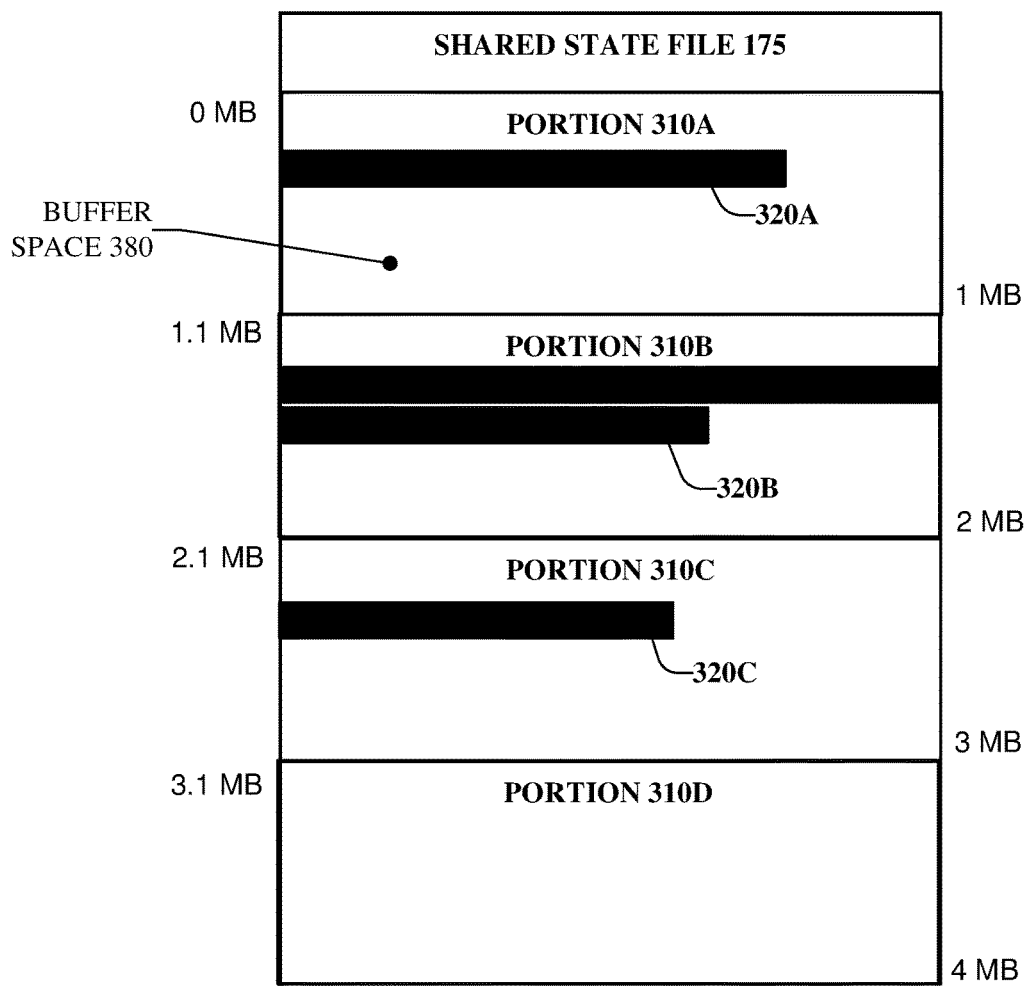
FIG. 3 provides example embodiments of a shared state file that can facilitate the maintaining of a shared state between devices, in accordance with one or more embodiments.
Figure 4:
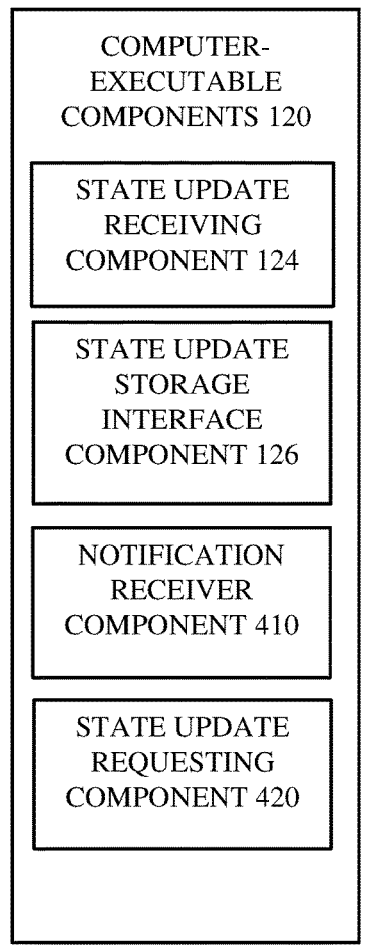
FIG. 4 illustrates a block diagram of a system that can facilitate the maintaining of a shared state between devices, in accordance with one or more embodiments.
Figure 5:
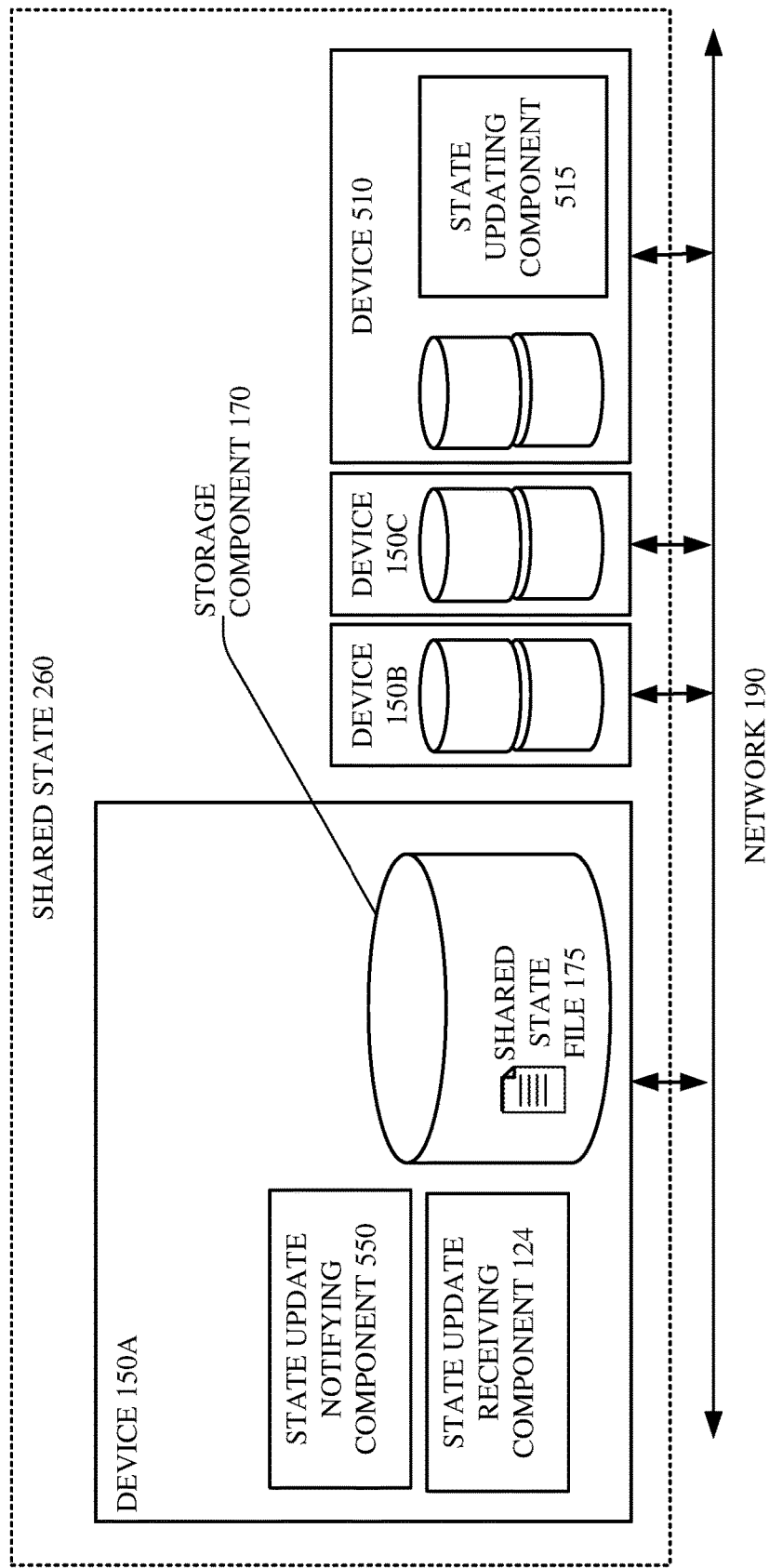
FIG. 5 illustrates a block diagram of a system that can facilitate the maintaining of a shared state between devices, in accordance with one or more embodiments.

To add additional details to the embodiments introduced above, as discussed below, FIG. 2 depicts a distributed system with computing devices in multiple zones, with a shared state maintained by different implementations of one or more embodiments. FIGS. 3-5 describe different embodiments of shared state file 175, and FIG. 6 describes different approaches to contention locking that can be used by one or more embodiments.

FIG. 2 illustrates a block diagram of a system 200 that can facilitate maintaining a shared state among computing devices, in accordance with one or more embodiments. Repetitive description of like elements and/or processes employed in respective embodiments is omitted for sake of brevity. System 200 includes shared state 260, which is shared by devices in illustrative zones 220A-B. Zone 220A includes devices 180A-B and zone 220B includes device 180C.

In one or more embodiments, devices 180A-C can share a common state by reading and altering shared state file 175. It should be noted that, one of the advantages of some embodiments described herein is that state information can be shared between devices 180A-C using the same capabilities that enable other functions of the distributed system. For example, in embodiments where devices 180A-C are NAS devices, these systems can use shared file protocols to read and alter operating system files in other systems. When embodiments are enabled in this NAS example, shared state 260 can be facilitated using the same file-sharing protocols that enable sharing of other files. As described further herein, devices 180B-C can, for example, access shared state file 175 to read and write shared state 260 data, e.g., in some implementations, using the same protocols used to access other content stored in device 180A. In alternative implementations, shared state file 175 can be implemented using a database application, e.g., using records and fields to store state data for retrieval. One type of database that can be used by one or more embodiments is a key-value store.

Continuing the example depicted in FIG. 2, in this example, zones 220A-B are included to illustrate how one or more embodiments can enable shared state 260 among differently situated device 180A-V. In this example, devices 180A-B, being in the same zone 220A are proximate to each other, and device 180A and 180C, being in zone 220B are not proximate to each other, e.g., geographically separated. While in some circumstances, protocols utilized to facilitate conventional IPC can be used to facilitate shared state 260, these protocols are often not suited for longer distance communication, e.g., in this example, between device 180A and device 180C.

FIG. 3 provides example 300 embodiments of shared state file 175 that can facilitate the maintaining of a shared state between devices 180A-C, in accordance with one or more embodiments. Repetitive description of like elements and/or processes employed in respective embodiments is omitted for sake of brevity. Shared state file 175 that can facilitate the maintaining of a shared state between devices 180A-C by storing respective state data blocks 320A-C in portions 310A-C, and having portion 310D available for additional devices.

In one or more embodiments shared state file 175 can be a data structure adapted to handle rapid access and manipulation of large amount of data. For example, in some implementations, shared state file 175 can comprise a Binary Large OBject (BLOB). In alternative embodiments, shared state file 175 can be an operating system file, and in other embodiments, shared state file 175 can be stored in a database for use.

In whichever structure is used to implement shared state file 175, one or more embodiments can store the data as an array, e.g., with different portions of data arranged in different regions of the array for each computing device of the system. In an example depicted in FIG. 3, portions 310A-D are set up as one megabyte blocks. As discussed further with FIG. 6 below, in a discussion of contention locking of shared state file 175, although one megabyte is allocated, to avoid file contention, buffer space 380 included with each portion 310A-D.

In an example depicted in FIG. 3, shared state file is implemented with one megabyte portions (e.g., 0.0-1.0, 1.1-2.0, 2.1-3.0, and 3.1-4.0. etc.). In each of the portions 310A-C, state data blocks 320A-C respectively is depicted starting at the boundary of the one megabyte portions. In an example implementation, the space used by state data blocks 320A-C is sparsely stored in a relatively small portion of the one megabyte allocated, e.g., one kilobyte of state data blocks 320A-C per portion 310A-C. It should be noted that portion 310D is included in the example to show how additional computing devices can be added to the existing file.

In an alternative embodiment, free space need not be included in shared state file 175 because, when needed, operating system file handling processes can expand the size of shared state file 175 to facilitate the addition of additional portion. 310D. In yet another embodiment, shared state file 175 can be implemented in a database system. For example, BLOBS stored in database records can be used to store state information for update and retrieval.

It should be noted that, as with all of the examples discussed herein, different implementation details can be used. For example, smaller portions 310A-C can be allocated, relatively larger state data blocks 320A-C can be used, state data blocks can start at point other than the boundary of portions, as well as other changes that would be apparent to one having skill in the relevant art(s), given the description herein.

FIGS. 4-5 provide illustrative diagrams to facilitate a discussion of components operating to send state updates to device 180A for use in updating state data blocks 320A-C of shared state file 175. FIG. 4 illustrates a block diagram of system 400 that can facilitate the maintaining of shared state 260 between devices 180A-C, in accordance with one or more embodiments. Repetitive description of like elements and/or processes employed in respective embodiments is omitted for sake of brevity.

In one or more embodiments, system 400 can include computer-executable components 120 can include, but are not limited to, state update receiving component 124, state update storage interface component 126, notification receiver component 410, state update requesting component 420, and other components described or suggested by one or more embodiments discussed herein.

In an example embodiment, a state update receiving component 124 of a first computing device 180A comprising a processor 160, can receive a first state update from a second computing device 180B via network 190 connection. In this and other embodiments, state update receiving component 124 can further identify in shared state file 175 stored in storage component 170, a first portion 310B of shared state file 175 allocated to the second computing device 180B.

In one or more embodiments, accessing portions 310A-D by multiple processes can be facilitate by these portions 310A-D of shared state file 175 being bounded in size, with buffer space 380 maintaining separation between portions, e.g., to improve the performance of updates and facilitate the use of different contention locking approaches described with FIG. 6 below.

In one or more embodiments, state update receiving component 124 can identify the first portion 310B of the shared state file 175 based on an offset value, e.g., to improve the performance of operations locating respective portions 310A-D. One way that can be used by one or more embodiments to facilitate the selection, by state update receiving component 124, of an offset to locate portion 310B can employ identifiers assigned to computing devices 180A-C. For example, in an implementation where each portion 310A-D is a megabyte in length, an identifier can be assigned to computing devices 180A-C that can specify the megabyte offset of respective portions 310A-C, e.g., computing device 180B can have an identifier ("2") corresponding to the 2 MB point where the portion begins.

Continuing this example, once portion 310B has been identified for the storage of state information for computing device 180B, in one or more embodiments, state update storage interface component 126 of first computing device 180A, can update, based on the first state update, the first portion 310B of the shared state file with the first state update data, e.g., state data block 320B.

In an additional embodiment, at substantially the same time the first state update is received state update receiving component 124 of the first computing device 180A, a second state update can be received by state update receiving component 124 from a second device 180C. As with the identification of portion 310B described above, based on the second state update being received from second computing device 180C state update receiving component 124 can further identify in shared state file 175, a second portion 310B of shared state file 175 allocated to the third computing device 180C.

In one approach to handling the substantially simultaneous receipt of the state updates by state update receiving component, file system protocols (e.g., contention locking, discussed further below) can be followed and, while state data blocks 320B are stored in portion 310B, the received second state update can be cached until data blocks 320A have been completely written to portion 310B. Once state data blocks 320C are generated based on the received second state update, data blocks 320C can be stored in portion 310C.

In some embodiments, in accordance with restrictions of some file systems, while data block 320B is being written to shared state file 175, shared state file 175 can be subject to a contention lock, e.g., a mechanism used by some operating systems to prevent simultaneous, uncoordinated reading from, and writing to, a shared resource such as shared state file 175. In an alternative to this sequential approach to altering a sequentially locked shared state file 175, with FIG. 6 below, some embodiments are described where state data blocks 320B and 320C can be written simultaneously to respective portions 310B and 310C by different instances of state update storage interface component 126, e.g., operating in different application threads of a multicore processor 165.

FIG. 5 illustrates a block diagram of system 500 that can facilitate the maintaining of shared state 260 between devices 180A-C, in accordance with one or more embodiments. Repetitive description of like elements and/or processes employed in respective embodiments is omitted for sake of brevity.

As depicted, system 500 includes shared state 260, which can be shared by two or more of devices 180A-C, and device 520. Devices 180A-C, and device 520 can be connected via network 190. Device 180A can include state receiving component 124, state update notifying component 550, and storage component 170. Storage component 170 can include shared state file 175. Device 510 can include state updating component 515.

In one or more embodiments, device 510 operates with shared state 260 linking devices 180A-C and 510 into a distributed system. In an example, device 510, while operating in the distributed system, performs operations that alter the shared state 260 as extended to device 510, e.g., an update that can be propagated to devices 180A-C.

In one or more embodiments, upon making the change in state needing to be propagated, device 510 can utilize state updating component 515 to send a state update via network 190 to device 190A. At device 190A, as discussed above, state update can be received by state update receiving component 124, and state update storage interface component 126 (not shown in FIG. 5) can update shared data block 310D to include the changed state.

In an embodiment with additional features, when the state update of device 515 is incorporated into shared state file 175, to maintain the shared state of the distributed system, the state update can be propagated to device 180B-C. One way to do this, uses state update notifying component 550 to propagate the result to other devices 180A-C. For example, the first computing device and the second computing device can be component devices of a distributed file system, and wherein the receiving the first state update from the second computing device is based on an event notification system (e.g., state update notifying component 550) of the distributed file system. One having skill in the relevant art(s), given the description herein, would appreciate that systems using shared state 260 can receive updates from the event notification system by subscribing to changes in shared state file 175.

In different implementations of this event notifying system approach, when a shared state update change occurs, the OS notifies the subscriber devices 180B-C, so that these systems do not have to expend resources checking to see if the file has been changed. In an additional embodiment of state update notifying component 550, update can be communicated to subscribing systems out of band of the communications channels used by operation of other device applications, e.g., to avoid affecting the performance of the other device applications.

Figure 6:
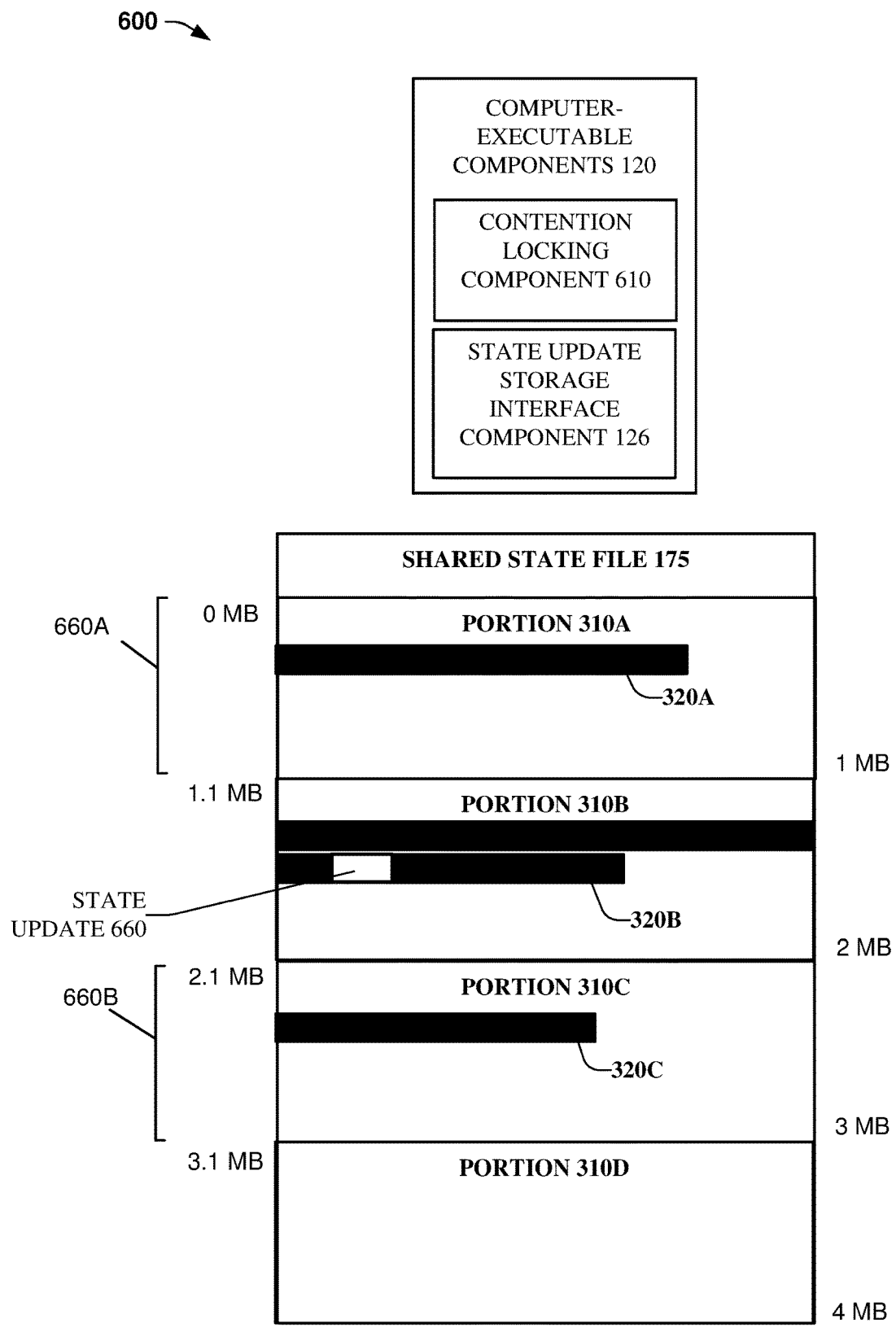
FIG. 6 illustrates a block diagram of a system that can facilitate the maintaining of a shared state between devices, by updating shared state file with different levels of contention locking, in accordance with one or more embodiments.

FIG. 6 illustrates a block diagram of system 600 that can facilitate the maintaining of shared state 260 between devices 180A-C by updating shared state file with different levels of contention locking, in accordance with one or more embodiments. Repetitive description of like elements and/or processes employed in respective embodiments is omitted for sake of brevity.

In contrast to the approaches to updating shared state file 175 described with FIG. 4 above, in the example depicted with FIG. 6, different approaches to contention locking can be used to improve, in some circumstances, the performance of shared state updates to shared state file 175 from multiple computing devices 180A-C.

In one such approach, one or more embodiments can forego the use of contention locking of shared state file 175, and allow access to different parts of shared state file 175 simultaneously by different processes. To mitigate potential problems from this approach, as noted with FIG. 4 above, one or more embodiments can structure shared state file 175 with different characteristics, including, but no limited to, relatively sparse utilization of allocated portions 310A-C, e.g., in an example implementation, state data block 320A uses one kilobyte of the available one megabyte in portion 310A, with the remainder allocated to buffer space 380. Thus, in an example where portions 310A and 310C are updated, the remaining portion of shared state file 175 (e.g., portions 310B and 310D) can remain unlocked during the updating.

In another approach to contention locking for shared state file 175 that can be used by one or more embodiments, in the above example where portions 310A and 310C are sought to be updated, one or more embodiments can implement contention locks 660A-B that apply only to respective portions 310A and 310C that are being updated. Such an approach can balance the extra overhead of the locking against potential problems that can occur with no contention locks applied, as with the previous approach.

Figure 7:
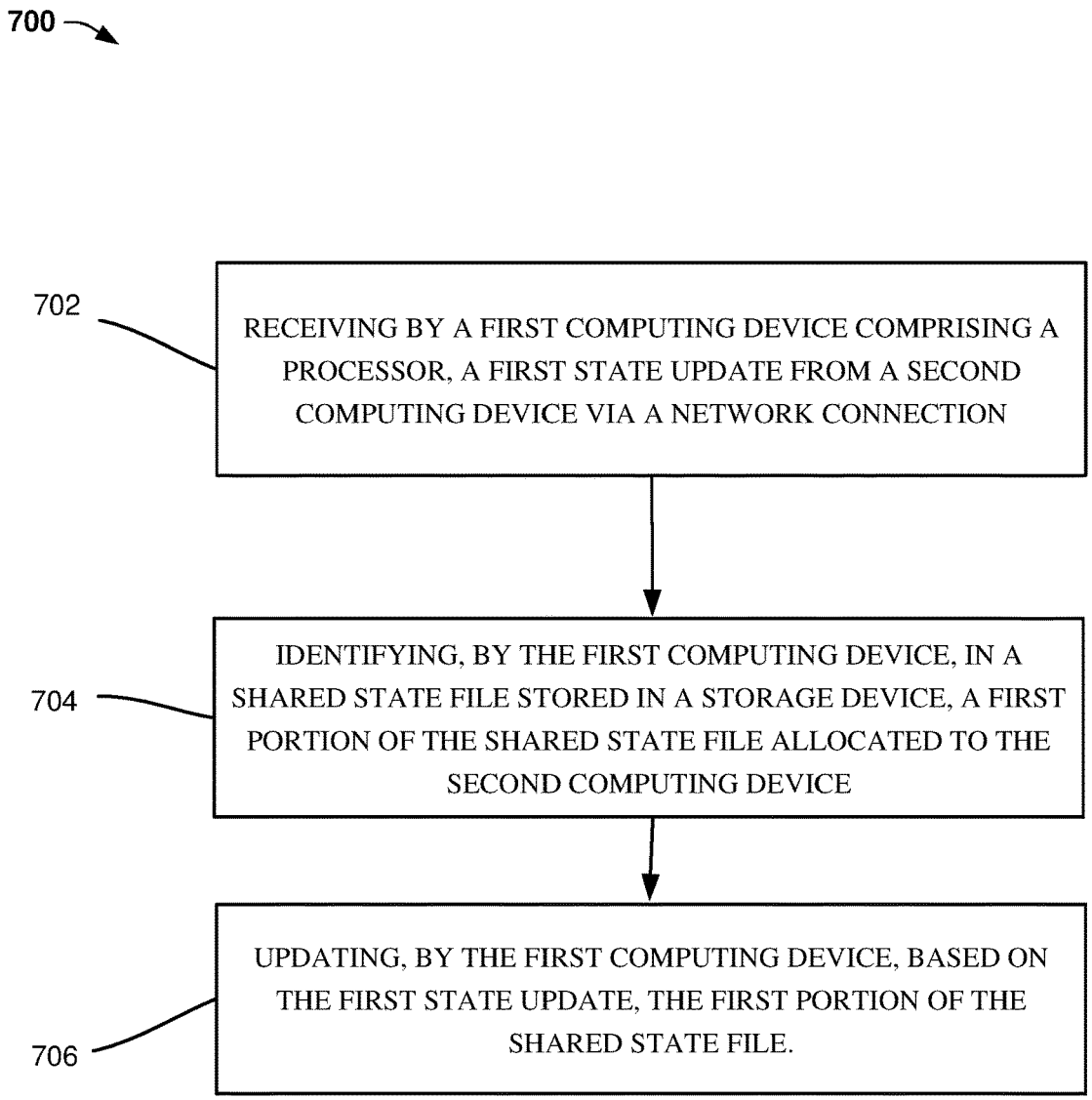
FIG. 7 illustrates an example flow diagram for a method that can facilitate the maintaining of a shared state between devices, in accordance with one or more embodiments.

FIG. 7 illustrates an example flow diagram for a method 700 that can facilitate the maintaining of a shared state 260 between devices 180A-C, in accordance with one or more embodiments. For purposes of brevity, description of like elements and/or processes employed in other embodiments is omitted.

At element 702, method 700 can comprise receiving by a first computing device comprising a processor, a first state update from a second computing device via a network connection. For example, in an embodiment, method 700 can comprise receiving a first state update from a second computing device 180B via a network 190 connection.

At element 704, method 700 can comprise identifying, by the first computing device, in a shared state file stored in a storage device, a first portion of the shared state file allocated to the second computing device. For example, in an embodiment, method 700 can utilize state update receiving component 124 to identify, by the first computing device 180A, in a shared state file 175 stored in a storage component 170, a first portion 310B of the shared state file 175 allocated to the second computing device 180B.

At element 706, method 700 can comprise updating, by the first computing device, based on the first state update, the first portion of the shared state file. For example, in one or more embodiments, method 700 can update, by the first computing device 105A, based on the first state update, the first portion 310B of shared state file 175.

Figure 8:
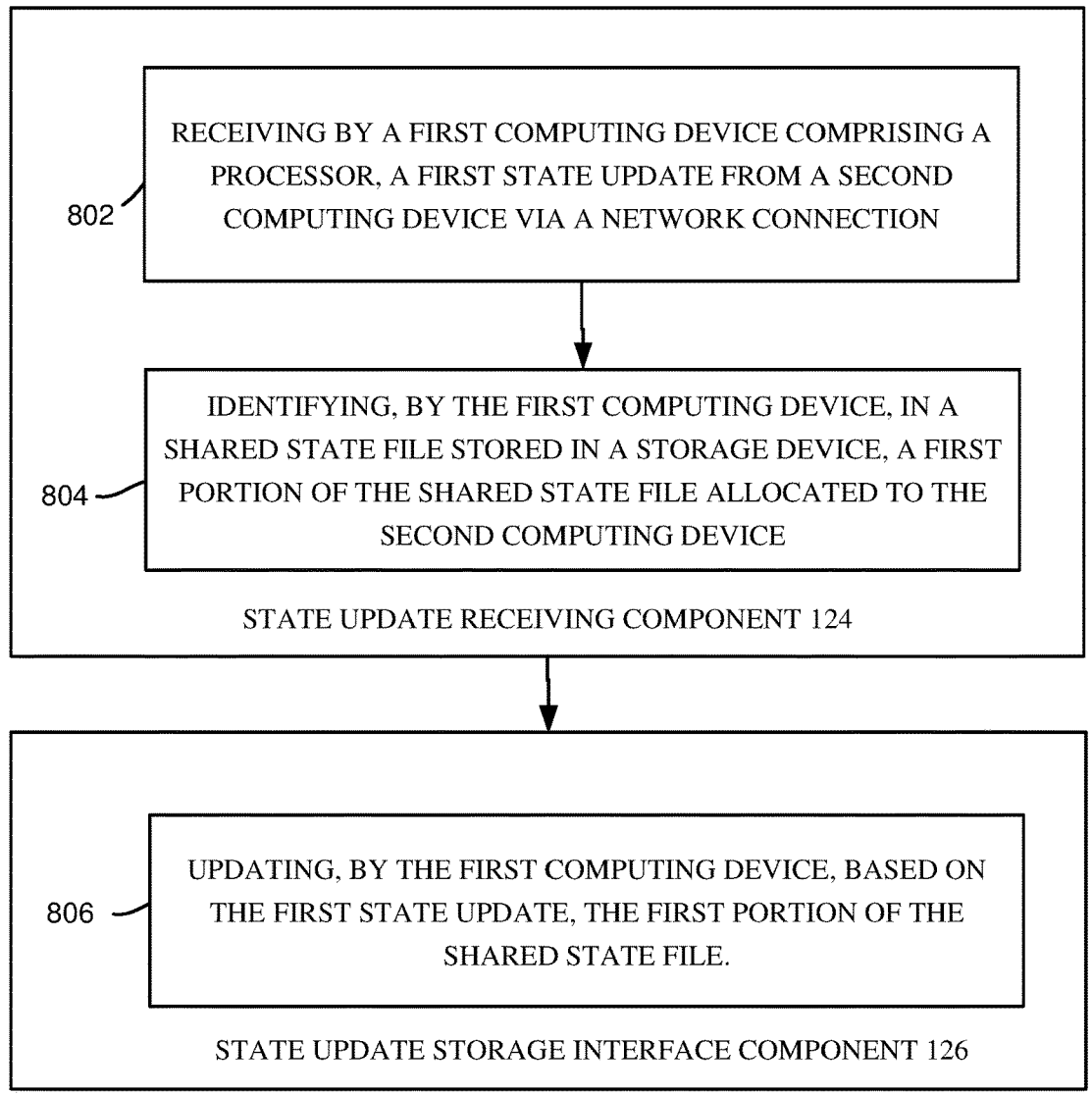
FIG. 8 is a flow diagram representing example operations of an example system 800 comprising state update receiving component, and State update storage interface component that can facilitate the maintaining of a shared state between devices, in accordance with one or more embodiments.

FIG. 8 is a flow diagram representing example operations of an example system 800 comprising State update receiving component 124, and State update storage interface component that can facilitate the maintaining of a shared state 260 between devices 180A-C, in accordance with one or more embodiments. For purposes of brevity, description of like elements and/or processes employed in other embodiments is omitted.

State update receiving component 124 can be configured 802 to receive a first state update from a second computing device via a network connection. For example, in an embodiment, state update receiving component 124 can be configured 802 to receive a first state update from a second computing device 180B via a network 190 connection.

State update receiving component 124 can further be configured 804 to identify, by the first computing device, in a shared state file stored in a storage device, a first portion of the shared state file allocated to the second computing device. For example, in an embodiment, state update receiving component 124 can further be configured 804 to identify, by the first computing device 180A, in a shared state file 175 stored in a storage component 170, a first portion 310B of the shared state file 175 allocated to the second computing device 180B.

State update storage interface component 126 can be configured 806 to update, by the first computing device, based on the first state update, the first portion of the shared state file. For example, in one or more embodiments, state update storage interface component 126 can be configured 806 to update, by the first computing device 105A, based on the first state update, the first portion 310B of shared state file 175.

Figure 9:
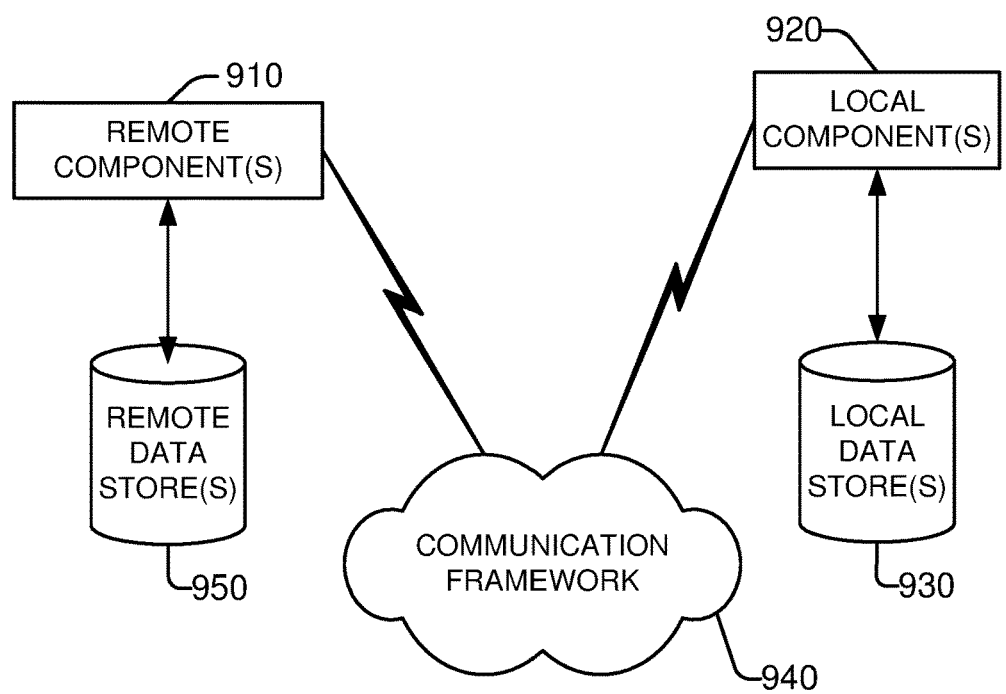
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
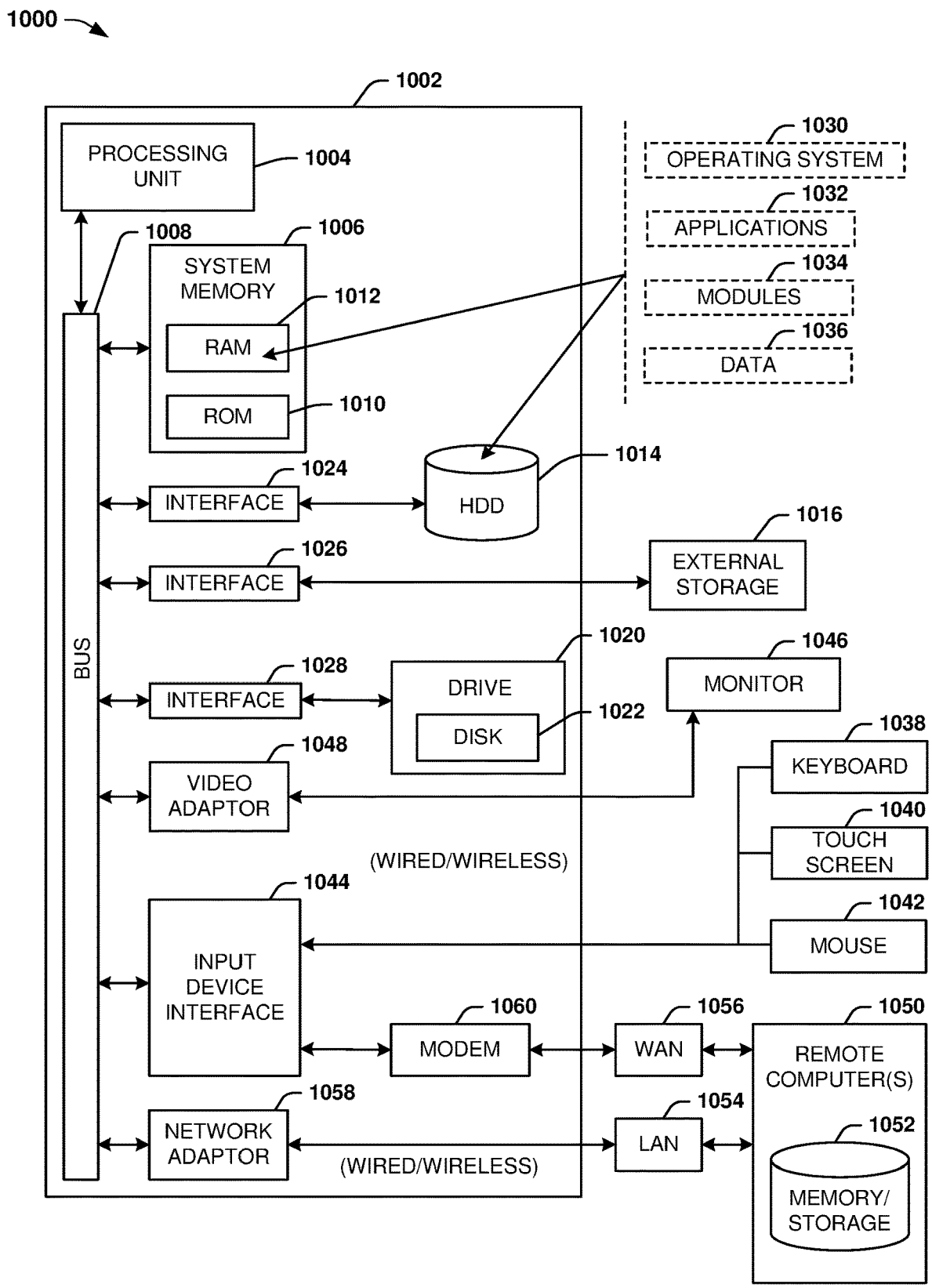
FIG. 10 illustrates an example block diagram of a computing system operable to execute the disclosed systems and methods in accordance with various aspects and implementations of the subject disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.).

While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A method, comprising:
  receiving, by a first computing device comprising a processor, a first state update from a second computing device via a network connection;
  identifying, by the first computing device, in a shared state file comprised of state data blocks stored in a storage device, a first portion of the state data blocks being allocated to a first state of the second computing device; and
  based on the first state update, updating, by the first computing device, the first portion of the state data blocks, wherein, during the updating of the first portion of the state data blocks, the first portion of the state data blocks of the first portion of data blocks is subject to a file contention lock, wherein a sparseness of utilization of a first data block of the first portion of data blocks was selected to reduce contention in use of the first portion of data blocks for provision of the first state.

2. The method of claim 1, wherein, further during the updating of the first portion of the state data blocks a second portion of the state data blocks based on a second state update from a third computing device is updated by the third computing device, wherein the updating the first portion of the state data blocks and the updating the second portion of the state data blocks occur substantially simultaneously, wherein the file contention lock comprises a first file contention lock, and wherein during the updating of the second portion, the second portion is subject to second contention lock.

3. The method of claim 2, wherein a remaining portion of the state data blocks, not comprising the first portion of the state data blocks and the second portion of the state data blocks, is unlocked during the updating the first portion of the state data blocks and the updating the second portion of the state data blocks.

4. The method of claim 1, wherein the sparseness of utilization of a first data block comprises a relative usage of the first data block for storage of the first state.

5. The method of claim 1, wherein the updating the first portion of the state data blocks is further based on an offset value of the second computing device, and wherein the offset value identifies the first portion of the state data blocks by offsetting from a point of the shared state file.

6. The method of claim 1, wherein the first computing device and the second computing device are component devices of a distributed file system, and wherein the receiving the first state update from the second computing device is based on an event notification system of the distributed file system.

7. The method of claim 1, wherein the shared state file comprises a flat file or a key-value store.

8. The method of claim 1, further comprising:
facilitating, by the first computing device, communicating the first state update to a fourth computing device to update a shared state among the first computing device, the second computing device, and the fourth computing device.

9. A first computing device, comprising:
a memory that stores computer executable components;
a drive storage device; and
a processor that executes the computer executable components stored in the memory, wherein the computer executable components comprise:
a state updating component to communicate, via a network, a first state update to a second computing device for an update of a shared state file stored of the second computing device; and
a state update receiving component to receive, via the network, a second state update for a third computing device from the second computing device, wherein the second computing device retrieved the second state update from the shared state file, wherein, during the updating of the shared state file:
a first portion of data blocks of the shared state file, allocated to the first computing device, is subject to a first file contention lock, and
a remaining portion of the data blocks of shared state file, not comprising the first portion, is unlocked during the updating the first portion of the shared state file, wherein a first data block of the first portion is bounded in a size of storage, and wherein a utilization of the size was selected to reduce contention in use of the first portion of the data blocks for provision of a first state of the first computing device.

10. The first computing device of claim 9, wherein the state updating component is to communicate the first state update to the second computing device further for an identification, in the shared state file, of the first portion.

11. The first computing device of claim 10, wherein the state updating component further updates a shared state among the first computing device, the second computing device, and the third computing device, based on the second state update.

12. The first computing device of claim 9, wherein the shared state file is bounded in size.

13. The first computing device of claim 9, wherein, during the updating of the first portion, a second portion of the data blocks of the shared state file based on a second state update from a third computing device is updated by the third computing device, wherein the updating the first portion and the updating the second portion occur substantially simultaneously, and wherein during the updating of the second portion, the second portion is subject to second contention lock.

14. The first computing device of claim 9, wherein the shared state file comprises a flat file or a key-value store.

15. The first computing device of claim 9, wherein the computer executable components further comprise:
a notification receiver component to receive a notification that the second state update is available; and
a state update requesting component to request, based on the notification, the communication of the second state update by the second computing device, wherein the second state update is received based on the request.

16. The first computing device of claim 15, wherein the first computing device and the second computing device are component devices of a distributed file system, and wherein the notification is received based on an event notification system of the distributed file system.

17. A non-transitory machine-readable medium comprising executable instructions that, when executed by a processor of a first computing device, facilitate performance of operations, the operations comprising:
receiving a first state update from a second computing device via a network connection;
identifying, in a shared state file stored in a storage device coupled to the first computing device, a first portion of state data blocks of the shared state file allocated to a state of the second computing device; and
updating, based on the first state update, the first portion, wherein, during the updating of the first portion:
the first portion is subject to a first file contention lock, and
a remaining portion of the data blocks of the shared state file, not comprising the first portion, is unlocked during the updating the first portion, wherein a utilization of a first data block of the first portion was selected to reduce contention in provision of the first state.

18. The non-transitory machine-readable medium of claim 17, wherein the operations facilitated further comprise updating a second portion of the data blocks of the shared state file based on a second state update received from a third computing device, and
wherein the second portion is subject to a second file contention lock, and wherein the updating the first portion and the updating the second portion occur substantially simultaneously.

19. The non-transitory machine-readable medium of claim 18, wherein the remaining portion does not comprise the first portion of the shared state file and the second portion of the shared state file, and wherein the remaining portion is unlocked further during and the updating the second portion of the shared state file.

20. The non-transitory machine-readable medium of claim 17, wherein the updating the first portion is based on an offset value of the second computing device, and wherein the offset value identifies the first portion by offsetting from a point of the shared state file.

* * * * *